(12) United States Patent
Boguet et al.

(10) Patent No.: US 6,499,620 B1
(45) Date of Patent: Dec. 31, 2002

(54) ANTINOISE DEVICE FOR VEHICLE, PARTICULARLY MOTOR VEHICLE, FUEL TANK

(75) Inventors: Jean Louis Boguet, Andrésy (FR); Didier Salliot, Achères (FR)

(73) Assignees: Automobiles Citroen, Nevilly (FR); Automobiles Peugeot, Paris (FR)

( * ) Notice: Subject to any disclaimer, the term of this patent is extended or adjusted under 35 U.S.C. 154(b) by 0 days.

(21) Appl. No.: 09/623,044
(22) PCT Filed: Jan. 28, 1999
(86) PCT No.: PCT/FR99/00159
§ 371 (c)(1), (2), (4) Date: Aug. 25, 2000
(87) PCT Pub. No.: WO99/43510
PCT Pub. Date: Sep. 2, 1999

(30) Foreign Application Priority Data

Feb. 25, 1998 (FR) .............................................. 98 02254

(51) Int. Cl.⁷ ............................................... B65D 25/02
(52) U.S. Cl. ...................................................... 220/563
(58) Field of Search ................... 220/563, 564, 220/562, 905, DIG. 24; 244/135 R, 135 B; 181/277; 280/830, 837, 838, 839

(56) References Cited

U.S. PATENT DOCUMENTS

| | | | | |
|---|---|---|---|---|
| 2,840,259 A | * | 6/1958 | Steidl | 220/563 |
| 4,483,454 A | * | 11/1984 | Rogers et al. | 220/562 |
| 4,796,773 A | * | 1/1989 | Gerhard | 220/563 |

FOREIGN PATENT DOCUMENTS

GB            2275454 A   *   8/1994

* cited by examiner

Primary Examiner—Stephen Castellano
(74) Attorney, Agent, or Firm—Connolly Bove Lodge & Lutz LLP

(57) ABSTRACT

The invention concerns a anti-noise device for a vehicle, particularly a motor vehicle, fuel tank (1) comprising a baffle (10) located in the tank (1), characterised in that the baffle (10) is flexible, located substantially in the tank (1) upper half and substantially perpendicular to the preferred axis of the fuel volume movement in the tank (1), the baffle (10) dimensions in the direction transverse to that of the fuel volume preferred movement (2) being smaller than the spacing of the tank walls (4, 5) located opposite the baffle (10) ends, to enable the baffle (10) to be deformed in flexion during the fuel ebb and flow.

11 Claims, 3 Drawing Sheets

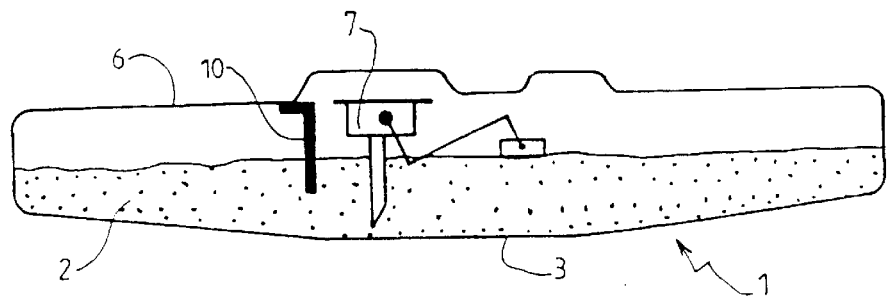
FIG. 3B
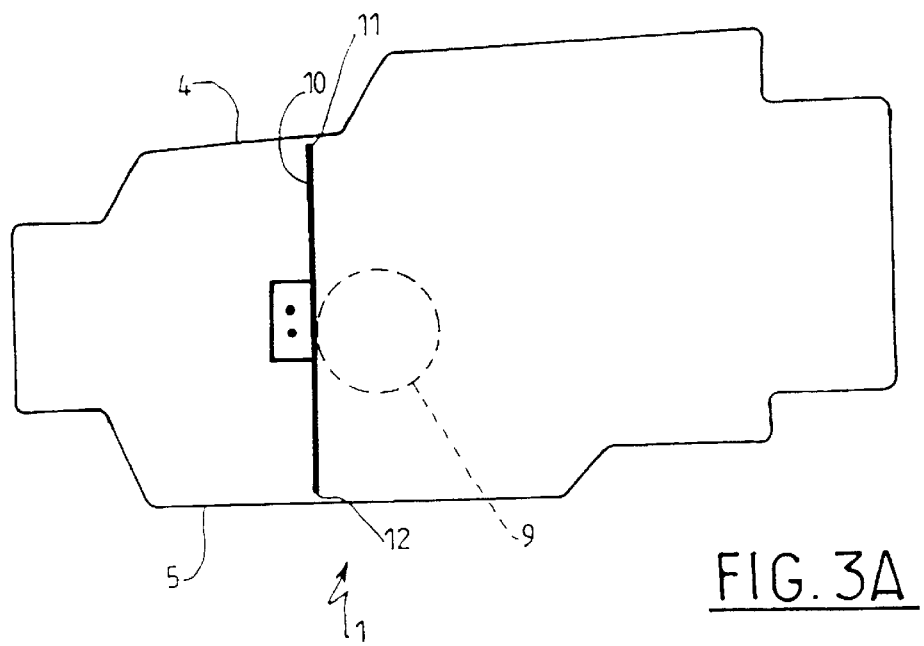
FIG. 3A
FIG. 4
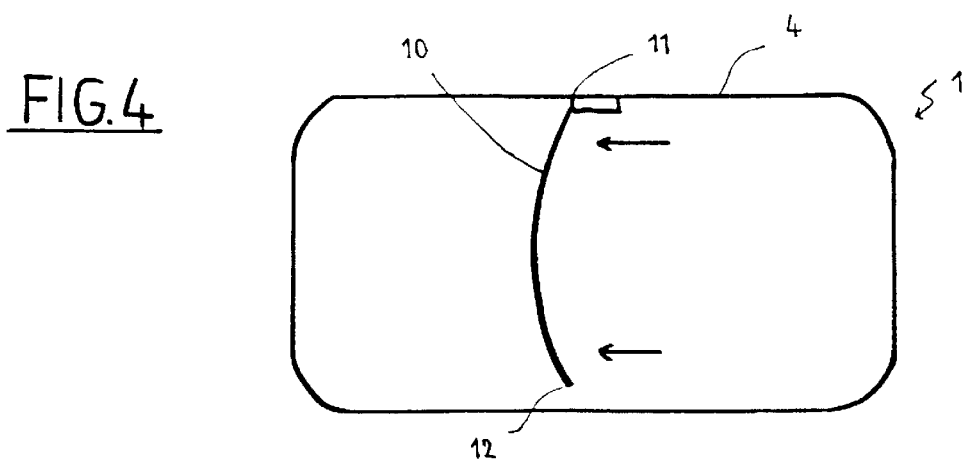

ANTINOISE DEVICE FOR VEHICLE, PARTICULARLY MOTOR VEHICLE, FUEL TANK

FIELD OF THE INVENTION

The invention relates to an anti-noise device for a vehicle fuel tank, in particular for cars.

BACKGROUND OF THE INVENTION

A vehicle's successive braking and restarting maneuvers cause translations of the fuel mass in the tank that the driver perceives in the form of noises with a shock effect. In particular, these noises happen when the level of fuel reaches a fraction of the total capacity of the tank.

We know of fuel tanks in particular through document FR 2,638,127 that contain rigid anti-noise partitions on the bottom of the tank or/and on the side walls of the tank. We also know through document FR 2,587,979 of tanks whose walls are distorted so as to form stiffening ribs and/or anti-lapping ribs.

However, we have noticed that this type of device does not resolve the lapping noise problems in the tank in a satisfactory manner. We also know of fuel tanks that contain rigid anti-noise partitions that are attached to the tank's upper wall and linked to another rigid partition attached to the bottom of the tank in order to create a baffle effect. Also, we know of rigid pierced partitions that extend over the entire height of the tank. Lastly, U.S. Pat. No. 2,806,622 describes a tank in which is arranged a support plate that is more or less horizontal and pierced. Two vertical breaking walls for the liquid, respectively upper and lower, are attached to the median part of the support plate.

However, none of these anti-noise devices are any more efficient in resolving the lapping noise problems in the tank.

SUMMARY OF THE INVENTION

One goal of this invention is to propose an anti-noise device for a vehicle fuel tank that compensates for all or part of the above-mentioned disadvantages of the prior art.

This goal is reached by the fact that the anti-noise device for a vehicle fuel tank, in particular that of a car, contains at least one partition located in the tank. This partition is flexible, is roughly located in the upper half of the tank and is roughly perpendicular to the preferred direction of the displacement of the fuel mass in the tank where the dimensions of the partition cross-wise in relation to the direction of the preferred displacement of the fuel mass are less than the tank's wall spacing located across from the extremities of the partition in order to allow the partition to distort and bend during the ebbs and flows of the fuel.

According to another special feature, the partition is roughly located in the center part of the tank.

According to another special feature, in the case of a tank that is roughly parallelepiped and whose longitudinal symmetry axis is roughly parallel to the vehicle's median longitudinal axis, the partition is roughly perpendicular to the bottom of the tank and to the vehicle's median longitudinal axis.

According to another special feature, the dimensions of the partition in a direction perpendicular to the bottom of the tank are in the range of half the inside height of the tank.

According to another special feature, the dimensions of the partition cross-wise in relation to the preferred direction of the displacement of the fuel mass are less that the spacing of the walls of the tank located across from the extremities of the partition with a value ranging between 0.5 and 5 cm and preferably between 1 and 2 cm.

According to another special feature, the partition is attached to a fixed part of the tank by at least one point located in the median part of the partition that is contained in a plane that is roughly perpendicular both to the bottom of the tank and to the partition, to allow the two free extremities of the partition to bend under the action of the ebbs and flows of the fuel.

According to another special feature, the partition is attached at its upper part to the upper face of the tank or/and to a mechanism that measures the level of the fuel or a fuel pumping system that is located in the tank.

According to another special feature, the partition is attached at its lower part to the upper part of a fuel trap arranged on the bottom of the tank.

According to another special feature, the partition has a thickness ranging between a few tenths of a millimeter and a few millimeters, and is preferably of 2 mm.

According to another special feature, the flexible partition is made of the same material as the tank.

Other characteristics and advantages of the invention will become apparent upon reading the detailed description that will follow. In order to understand this description, we will refer to the attached figures, where:

BRIEF DESCRIPTION OF THE DRAWINGS

FIG. 3A is a drawing of a sectional view from above of a third tank equipped with the anti-noise device as set forth in the invention, in a second method of execution, FIG. 3B is a drawing of a sectional side view of the tank in FIG. 3A, FIG. 4 is a drawing of a sectional view from above of a tank equipped with an anti-noise device as set forth in the invention, in another method of execution.

Figure 1A:
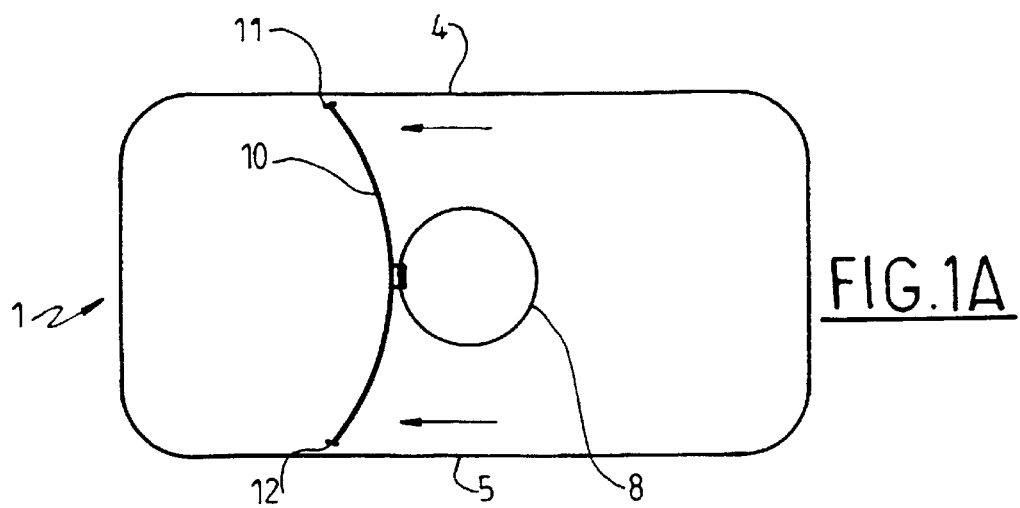
FIGS. 1A and 1B are drawings of a sectional view from above of a first tank equipped with the anti-noise device as set forth in the invention, in a first method of execution, the figures showing a flexible partition in respectively flexed deflections.
Figure 1B:
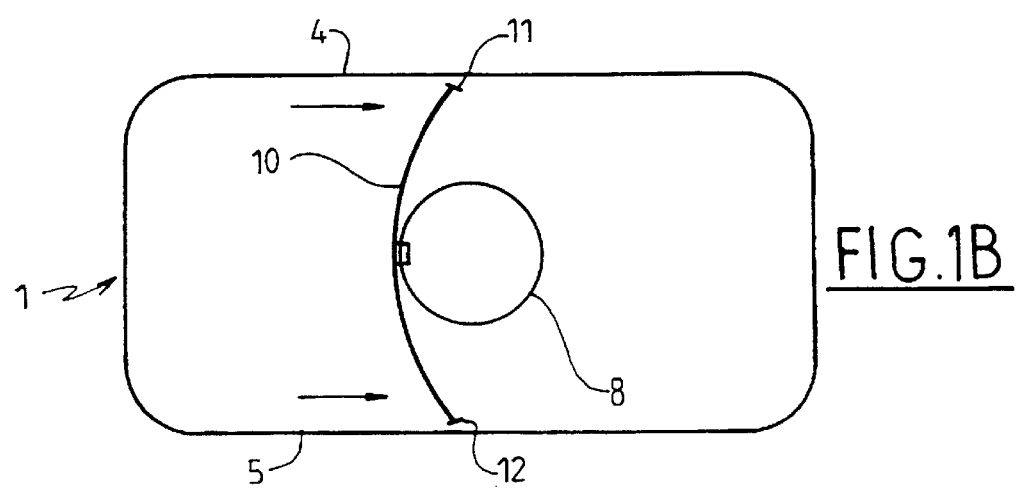
Figure 1C:
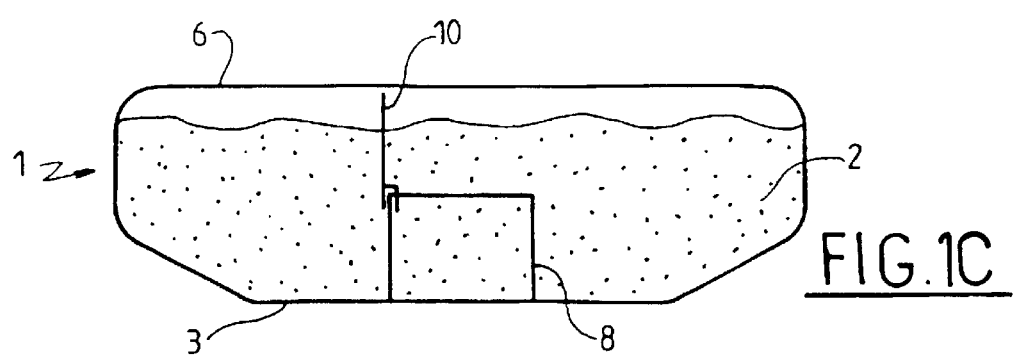
FIG. 1C is a drawing of a sectional and side view of the tank in FIGS. 1A and 1B.
Figure 2B:
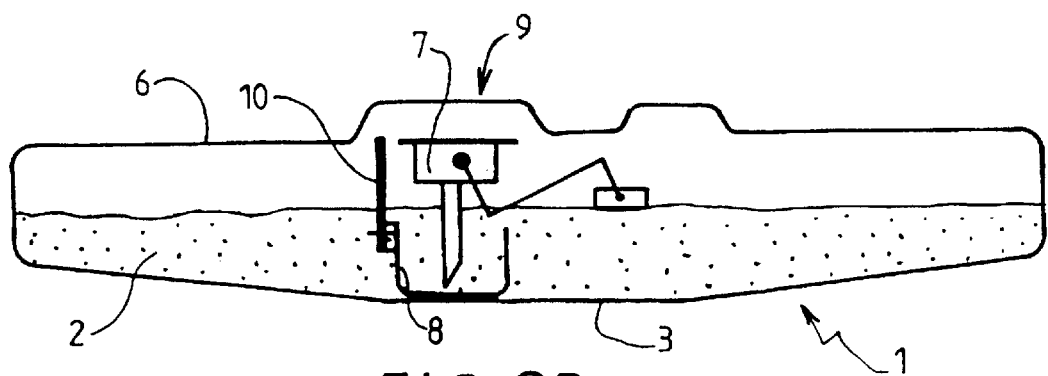
FIG. 2B is a drawing of a side and sectional view of the tank in FIG. 2A.
Figure 2A:
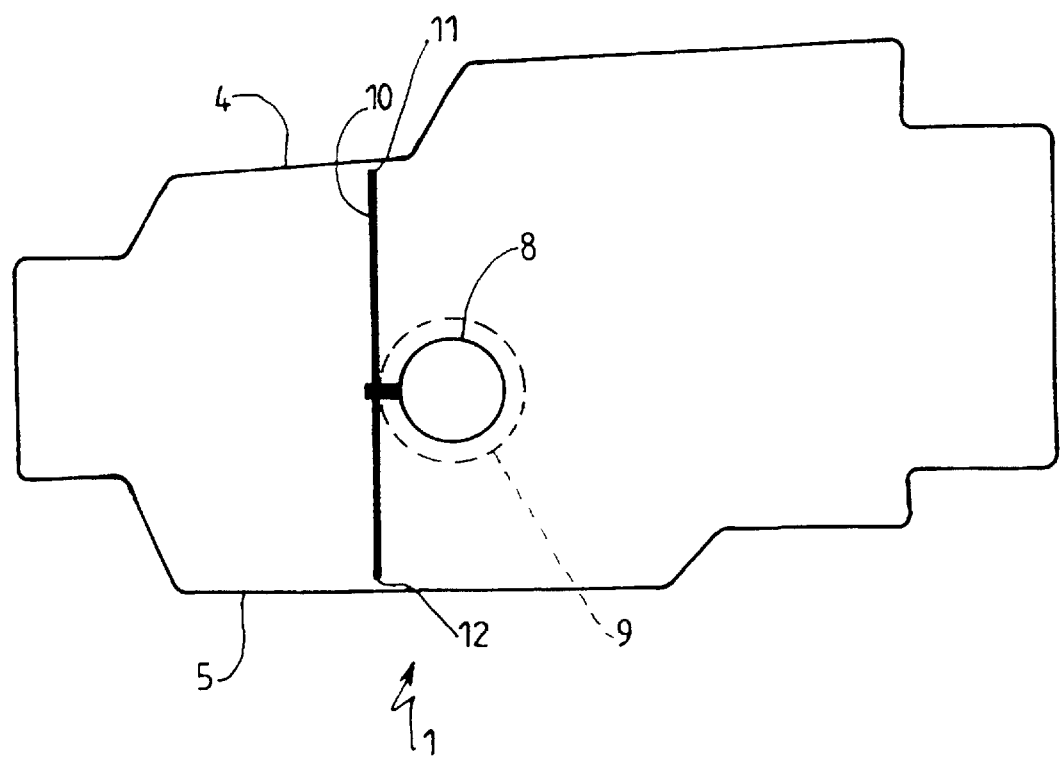
FIG. 2A is a drawing of a sectional view from above of a second tank equipped with the anti-noise device as set forth in the invention, in the first method of execution.

The invention will now be described in reference to FIGS. 1A through 1C, 2A and 2B.

DETAILED DESCRIPTION OF THE INVENTION

The anti-noise device for the fuel 2 tank 1 of a vehicle as set forth in the invention consists of a flexible partition 10 located in the tank 1 and intended to eliminate the noise from the lapping of the fuel 2.

In the example of FIGS. 1A through 1C, 2A and 2B, the tank 1 is roughly rectangular and contains a fuel trap 8 located on the bottom 3 of the tank 1. The fuel trap 8 consists of a cylindrical bowl located roughly in the center of the wall that makes up the bottom 3 of the tank 1. In the examples that are represented, the longest lateral walls 4, 5 of the tank 1, or longitudinal walls are roughly parallel to the median longitudinal axis (not represented) of the vehicle.

The flexible partition 10 is attached in the center of its lower edge to the upper edge of the fuel trap 8 in such a way that the flexible partition 10 is roughly perpendicular to the bottom 3 and the longitudinal walls 4, 5 of the tank 1. In FIGS. 1A through 1C, 2A and 2B, the flexible partition 10 is attached to the front part of the fuel trap 8 in relation to the front of the vehicle. Of course, the flexible partition 10 may also be attached to the back part of the fuel trap 8. The flexible partition 10 is attached to the fuel trap 8 using a clip, rivet or any other similar means.

The dimensions of the flexible partition 10 in the direction that is perpendicular to the longitudinal walls 4, 5 are less that the spacing of these walls 4, 5 in order to allow the partition 10 to flex during the ebbs and flows of the fuel 2. Thus the fuel is slowed down during its translations between the two parts of the tank 1 that are delimited by the flexible partition 10. The dimensions of the flexible partition 10 in the direction that is perpendicular to the longitudinal walls 4, 5 of the tank 1 are less than the spacing of the latter by a value that ranges between 0.5 and 5 cm, and preferably between 1 and 2 cm. The dimensions of the flexible partition 10, in a direction that is perpendicular to the bottom 3 of the tank 1, are in the range of one half of the inside height of the tank 1. The thickness of the flexible partition 10 may range between a few tenths of a millimeter and a few millimeters, and is preferably in the 2 mm range.

Thus, the flexible partition 10 is roughly located in the center part and in the upper half of the tank 1, where the free extremities 11, 12 of the partition 10 can bend under the action of the ebbs and tides of the fuel 2 to allow the latter to pass and slow down.

This flexible partition 10 significantly reduces the noise in the tank 1, in particular when the level of fuel 2 is greater than one half its capacity. Indeed, by slowing down the progression of the fuel, the partition reduces the shock caused by the arrival of the fuel at the end of the tank and reduces the force of the impact of the fuel mass on the upper wall 6.

The flexible partition 10 is made of a supple material that can be exposed for long periods of time to hydrocarbons. Preferably, the flexible partition 10 can be made of the same material as the tank 1.

The flexible partition 10 can, for example, be introduced into the tank 1 by the passing 9 of the gauge. It is therefore possible to attach this flexible partition 10 in tanks that are already installed on the vehicle. Also, as described below, the flexible partition 10 can be attached to the upper wall 6 of the tank 1, in particular in cases where the tank does not have a fuel trap 8.

FIGS. 3A and 3B illustrate the application of the invention to a tank 1 that does not have a fuel trap. The tank 1 of FIGS. 3A and 3B is different from that of FIGS. 2A and 2B only in that it does not have a fuel trap 8. The elements that are identical to those described above are designated by the same numerical references.

In the application of FIGS. 3A and 3B, the flexible partition 10 is attached by the median part of its upper edge to the upper wall 6 of the tank 1. The flexible partition 10 has the same characteristics of orientation and the same dimensions as those described above in reference to FIGS. 2A and 2B for the tank that has a fuel trap 8. Meaning that the flexible partition 10 is located roughly in the center part and in the upper half of the tank 1 and that the free extremities 11, 12 of the partition 10 can bend under the action of the ebbs and tides of the fuel 2.

The flexible partition 10 can be soldered to the upper wall 6 of the tank 1 or can be attached by any other similar means. Of course, this method of execution is in no way restrictive. Thus, in a variable that is not represented, the flexible partition 10 can also be clipped or attached by any other means to the mechanism that measures the level of the fuel or to the fuel pumping system located in the tank 1.

Thus it is easy to see that we have an inexpensive, anti-noise device of great simplicity for tank 1 that easily can be adapted to existing tanks without requiring any change in their structure.

We have also noticed that this anti-noise device is particularly well adapted when the tank is placed longitudinally under the floor of the vehicle.

Of course, the invention is not to be limited to the preferred methods of execution described above. Thus, although only one flexible partition 10 is sufficient to significantly reduce the lapping noises in the tank 1, we can envisage arranging several flexible partitions 10 of the same type in the tank 1.

Also, it is possible to foresee that the flexible partition(s) 10 be made interdependent by one 11 of their extremities to a longitudinal wall 4 of the tank, to allow the free extremity 12 of the partition to bend and thus brake the fuel (FIG. 4).

Other modifications within reach of the man of the art are part of the context of the invention.

What is claimed is:

1. A reduced noise, fuel tank system for a vehicle, comprising: a fuel tank of generally cubical shape having three pairs of substantially confronting walls;

a single, flexible, continuous panel defining a partition, said panel being capable of bending in response to surging fuel forces but being normally planar when not subjected to surging fuel forces, said panel having two large, normally flat surfaces which face in opposite directions when the panel is in its planar configuration, said panel is located primarily and almost entirely in an upper half of the tank, said panel is non-porous;

said panel oriented substantially perpendicular to a preferred direction of displacement of a fuel mass within the tank so that said two large, normally flat surfaces are normal to the preferred direction of displacement of said fuel mass;

said panel having at least one moveable free edge which moves relative to the tank;

said panel having a cross-wise dimension extending horizontally and perpendicular to the preferred direction of displacement of said fuel mass, said cross-wise dimension being less than the space between the pair of confronting walls which are parallel to the preferred direction of displacement of said fuel mass, the surface area of each of said large, normally flat surfaces provides a barrier which extends over most of the cross sectional area of the upper half of the tank of a cross section which is normal to the preferred direction of displacement of said fuel mass and said panel substantially blocks flow in the upper half of the fuel tank;

said panel is allowed to bend during the ebbs and flows of the fuel such that most of each of said large, normally flat surfaces bend to form a continuously curved surface.

2. The fuel tank system as set forth in claim 1, wherein the partition is located substantially in the center part of the tank.

3. The fuel tank system as set forth in claim 1, wherein the tank is substantially parallelepiped and whose longitudinal symmetry axis is substantially parallel to the median longitudinal axis of the vehicle, the partition being substantially perpendicular to the bottom of the tank and to the median longitudinal axis of the vehicle.

4. The fuel tank system as set forth in claim 1, wherein the dimension of the partition, in a direction perpendicular to the bottom of the tank, is approximately one half the interior height of the tank.

5. The fuel tank system as set forth in claim 1, wherein the dimensions of the partition cross-wise to the preferred direction of the displacement of the fuel mass being less than the spacing of correspondingly positioned walls of the tank by a difference ranging between 0.5 and 5 cm.

6. The fuel tank system as set forth in claim 1, wherein the partition is attached to a fixed part of the tank, by at least one point located in a median part of the partition that is contained in a plane that is substantially perpendicular both to the bottom of the tank and to the partition, to allow both free extremities of the partition to bend under the action of the ebb and tide of the fuel.

7. The fuel tank system as set forth in claim 6, wherein the partition is selectively attached at its upper part to the upper face of the tank, a mechanism that measures the level of the fuel, or to a fuel pumping system that is located in the tank.

8. The fuel tank system as set forth in claim 6, wherein the partition is attached at its lower part to the upper part of a fuel trap arranged on the bottom of the tank.

9. The fuel tank system as set forth in claim 1, wherein the partition is made integral, at one of its extremities, to a longitudinal wall of the tank, an opposite extremity being free.

10. The fuel tank system as set forth in claim 1, wherein the partition has a thickness that ranges between a few tenths of a millimeter and a few millimeters.

11. The fuel tank system as set forth in claim 1, wherein the flexible partition is made of the same material as the tank.

* * * * *